Figure 1:
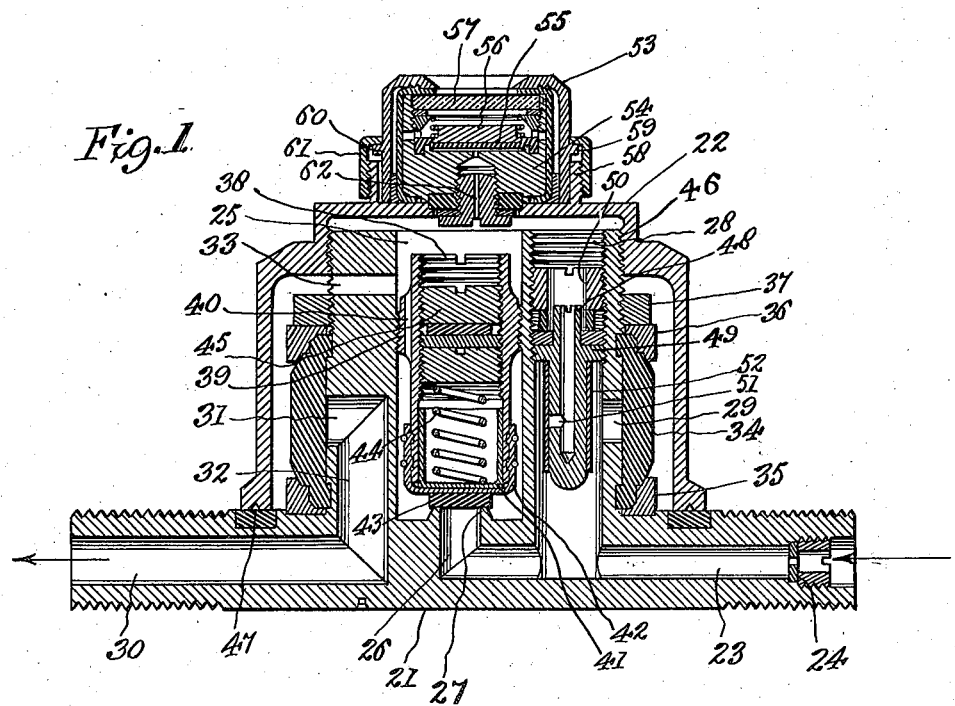

Dec. 27, 1938.  P. M. BOURDON  2,141,507

DEVICE FOR AUTOMATICALLY CONTROLLING THE INFLATION OF TIRES

Filed Sept. 28, 1936

Inventor

Pierre Marcel Bourdon

By Wilkinson & Mawhinney

Attorneys.

Patented Dec. 27, 1938

2,141,507

UNITED STATES PATENT OFFICE 2,141,507

DEVICE FOR AUTOMATICALLY CONTROLLING THE INFLATION OF TIRES

Pierre Marcel Bourdon, Paris, France, assignor to Michelin et Cie, Clermont-Ferrand, France, a corporation of France Application September 28, 1936, Serial No. 103,019
In France November 6, 1935

5 Claims. (Cl. 137—69.5)

The present invention relates to improvements in devices for automatically controlling the inflation of tires and has for an object to provide a device to prevent overinflation of tires and the like.

A further object consists in providing a device by means of which air is introduced into a tire gradually and at the required pressure and which automatically shuts off the flow to the tire when a predetermined maximum is exceeded.

Another object is to provide a device by means of which the pressure of air flowing to inflate a tire may be controlled within a very small range of variation.

The pressure compensating devices disclosed in my U. S. application Serial No. 17,365, filed April 19, 1935 are employed in this invention along with other elements.

With the foregoing and other objects in view, the invention will be more fully described hereinafter, and will be more particularly pointed out in the claims appended hereto.

In the drawing, wherein like symbols refer to like or corresponding parts throughout the several views.

Figure 2:
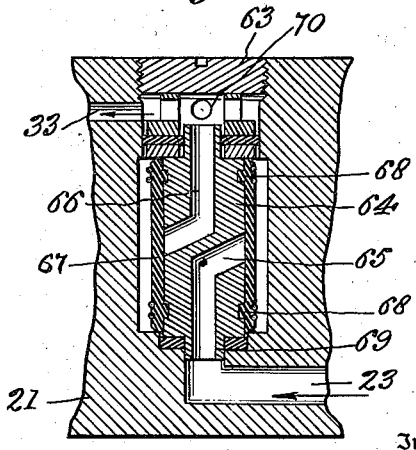

Figure 1 is a vertical longitudinal section taken through a practical form of the device and Figure 2 is a vertical section taken through a modification of the shut-off valve employed in the device of Figure 1.

One practical embodiment of this invention is shown in section in Figure 1 in which a body portion 21 is provided with the various channels and valves required and is covered by a cap 22. The body 21 is provided with a longitudinal duct 23 open at its outer end for temporary attachment to a compressed air hose during the inflation of a tire or other container. The duct 23 has at its outer end a reducing tip 24 which is threaded into the outer end of the duct. The tip is provided with a small passageway which serves to reduce the flow of gas and so does away with the dynamic effect of the entering gas under pressure. Near its center the body 21 is provided with a vertical bore 25 which communicates at its lower end through a reduced bore 26 with the duct 23. At the juncture between the bores 25 and 26 is a raised seat 27. The body 21 has also a second vertical bore 28 which is drilled down to communicate with the duct 23. A port 29 is drilled through the side of the body 21 into the bore 28. At the opposite side of the body 21 is a longitudinal duct 30 which is adapted to be connected to the tire or other chamber to be inflated. A port 31 opens at the side of the body 21 and communicates with the duct 30 by means of the bore 32. At the same side of the body 21 above the port 31 a bore 33 is drilled from the side of the body into the bore 25. The top of the body 21 is threaded externally to receive the corresponding internally threaded portion of the cap 22. As will be seen from the drawing the ports 29 and 31 are at approximately the same level on the body 21. A rubber membrane 34 is stretched around the body 21 so as to cover the two ports 29 and 31. The membrane 34 is held in place by means of the retaining rings 35 and 36 and the nut 37. It will, therefore, be seen that air entering through the duct 23 can pass up the bore 28 and through the port 29. Here, if the pressure of the air is sufficient, the membrane 34 will be raised and lifted all the way around the body 21 so that air can flow freely from the port 29 to the port 31 from which it passes through the bore 32 and duct 30 to the tire.

In the bore 25 of the body 21 is placed a valve composed of a cylinder 38 which is provided with the externally threaded enlarged portion 39 which is threaded down into the bore 25. At one point in this enlarged portion 39 a communicating passage 40 is provided to permit flow of gas above and below the enlarged portion. Inserted in the lower end of the cylinder 38 is a sliding piston 41 which is closed at its outer end and presses against the membrane 42 stretched over the lower end of the cylinder 38. Attached to the membrane 42 is a valve plunger 43 which fits on the seat 27 and closes the same. The piston 41 is urged downwardly against the membrane 42 by means of a spring 44 the tension of which is adjustable by advancing or retracting the screw assembly 45 in the cylinder 38. The adjustment of this spring 44 determines the pressure that will be required to lift the valve plunger 43 from the seat 27.

The cap 22 is secured tightly around the body 21 by means of the intermeshing threads 46 at the upper part of the body and at the reduced part of the cap. A seal is provided for the edges of the cap by placing the flexible gasket 47 in a groove in the body 21 and by grooving the bottom of the cap 22 for tighter engagement with the gasket 47. This cap 22 provides around the body 21 a confined air space which consists of the space outside of the membrane 34, the space above the body 21 and certain sections of the bores in the body 21.

In the device of Figure 1, as described above, air entering the duct 23 at the required pressure lifts the membrane 34 and passes freely through the duct 30 to the tire. Should the pressure of the gas in the duct 23 reach sufficient strength to lift the valve plunger 43 from the seat 27 air will pass through the passage 40 and the duct 33 into the space around the outside of the membrane 34 thus closing the membrane, shutting the ports 29 and 31 and preventing further communication between them. The tension of the spring 44 may be regulated so that the plunger 43 will be lifted by a pressure only a few grams greater than that required for lifting the membrane 34 and so the inflation may take place between very close limits.

When a tire has been inflated with this device there will remain in the free space enclosed by the cap 22 air at the pressure of inflation. It is necessary of course to remove this compressed air before starting another inflation because of the additional pressure the enclosed air exerts upon the membrane 34. To accomplish this the device is provided with a valve in the bore 28. The valve consists of a barrel 48 which is threaded down into the bore 28 by means of its annular externally threaded flange 49. The barrel 48 is further held in the bore 28 by means of the externally threaded nut 50. The barrel 48 has a central bore as also has the nut 50. Near the lower end of the bore of the barrel 48 a transverse port 51 is drilled through the side of the barrel. Over the outside of the barrel and covering the port 51 is an elastic sleeve 52. The operation of this valve is as follows:

When a tire has been inflated until the inflation has been stopped by the lifting of the plunger 43, air has been entrapped in the space enclosed by the cap 22. This air has access to the underside of the sleeve 52 by means of the port 51 and the bores of the barrel 48 and the nut 50. When, therefore, the compressed air delivery hose is detached and pressure is removed from the duct 23 the pressure on the outside of the sleeve 52 drops to atmospheric pressure and the air acting on the inside of this sleeve through the port 51 causes it to open and allows the entrapped air to escape.

A further addition to the device consists in providing the top of the cap 22 with a pressure indicator 53 of the type disclosed in my application, Serial No. 24,405, filed May 31, 1935, now Patent No. 2,058,557, granted Oct. 27, 1936. This device consists generally in a body 54 having an opening communicating with the source of pressure. An elastic membrane 55 is secured with one side against this opening. On the other side of the membrane 55 is placed a mirror or the like 56. A window of glass 57 is provided in front of the mirror 56 and the space between these members is filled with a colored liquid. When pressure is everted on one side of the membrane 55 the mirror 56 is advanced against the glass 57 and the change in appearance from the opaque liquid to the brilliant mirror serves as an indication of pressure. The strength of the membrane 55 determines the pressure at which the mirror 56 will be moved. The other details of this pressure gauge are described in the application above referred to. The cap 22 is modified, however, in that an upstanding annular flange 58 is provided. The casing 59 of the pressure gauge is of a size to fit within this annular flange 58 and the casing has on its side an outstanding flange 60. A clamp ring 61 fits over the casing and engages the flange 60 thereof. Also the top of the cap 22 is pierced centrally to receive the nozzle 62.

In Figure 2 is shown a modification of the valve in the bore 25. In this figure a device such as the simple form shown in my application, Serial No. 17,365 is shown. The device may be inserted into the bore 25 and the plug 63 used to close the top of the bore. The valve itself consists in a barrel 64 which has two ducts 65 and 66 drilled therein. The ends of the ducts open at about the middle of the barrel at opposite sides and their openings are covered by an elastic membrane 67 which is tightly secured to the outside of the barrel 64 as at 68. The shape of the bore 25 is changed in this modification to provide a reduced portion at the bottom opening into the duct 23, the reduced portion serving as a place of attachment for the reduced lower end 69 of the barrel 64. The upper end of the barrel 64 is anchored in the bore 25 by means of the block 70 which is held down by the plug 63. The block 70 is provided with transverse and vertical ducts which serve to establish communication between the bore 66 of the barrel 64 and the enclosed air within the cap 22. In this case instead of the spring 44 to determine the pressure at which communication between the ports 29 and 31 is cut off, there is provided the elastic membrane 67. This membrane is of such a strength as to remain closed while inflation is proceeding at the normal pressure but is of such a strength that a slight increase in pressure will cause it to open and will cause air to flow through the duct 33 and so close the membrane 34 and stop communication between the air source and the tire.

In the complete device as shown in Figure 1 or as made with the modified valve of Figure 2 the pressure indicator 53 serves as a valuable aid to the operator. While overinflation is prevented by the controlling device yet the operator has no indication when inflation is complete. The pressure indicator is, therefore, a valuable part of the assembly and occasions a great saving of time in inflating tires and the like.

It is to be noted that in the preceding description reference has almost been exclusive to tires but it is evident that the device may be used in connection with any other chamber or with any gas besides air. It is also to be noted that several tires may be connected simultaneously to the duct 30 and so all may be inflated to the same pressure.

It is obvious that various changes and modifications may be made in the details of construction and design of the above specifically described embodiment of this invention without departing from the spirit thereof, such changes and modifications being restricted only by the scope of the following claims.

What is claimed is:

1. In a device of the character described a body having inlet and outlet passages therein, said passages being non-communicating and opening externally of said body; an elastic membrane tightly secured over said openings adapted to be raised by pressure acting through said openings to permit flow of air between the passages, the tension of the membrane being such that pressure substantially that desired for the tire is required to raise it; an air tight casing about said membrane; and a shut-off valve in said body communicating with said inlet passage and with said casing and adapted to open under force of pressure greater than the desired pressure for the tire to admit air to the casing around the membrane and so close the membrane stopping flow of air between the passages.

2. In a device of the character described a body having inlet and outlet passages therein, said passages being non-communicating and opening externally of said body; an elastic membrane tightly secured over said openings adapted to be raised by pressure acting through said openings to permit flow of air between the passages, the tension of the membrane being such that pressure substantially that desired for the tire is required to raise it; an air tight casing about said membrane; a shut-off valve in said body communicating with said inlet passage and with said casing and adapted to open under force of pressure greater than that desired for the tire to admit air from the inlet passage to the casing around the membrane and so close the membrane stopping flow of air between the passages; and an indicator associated with said casing to show the presence of air under pressure therein and so to indicate the completion of the inflation.

3. In a device of the character described a body having inlet and outlet passages therein, said passages being non-communicating and opening outwardly of the body; an elastic membrane tightly secured over said openings adapted to be raised by pressure exerted through an opening to permit flow of air between the openings under said raised membrane; an air tight casing disposed about said membrane; said body also having a bore connecting said inlet passage with the space enclosed by said casing; a valve biassed to close said bore and adapted to open under force of a predetermined pressure in the inlet passage greater than the pressure required to raise said elastic membrane by a given amount to permit flow of air into the casing to close the membrane upon the ports and prevent further flow of air to the outlet passage and the tire; and relief means in the body comprising another bore connecting the inlet passage and the space enclosed by the casing and a check valve in the bore adapted to operate when pressure is removed from the inlet passage and vent the space enclosed by the casing.

4. A device for automatically controlling the inflation of tires, comprising an air supply tube, a tire inflating air tube, means including a resilient valve biased to close for connecting said tubes at a pressure above a predetermined minimum, and means operative when the pressure in the inflating tube exceeds the predetermined minimum by a given amount to cause air from said supply tube to be applied to said valve in a manner to augment the biasing force to effect its closing.

5. A device of the character described comprising adjacent non-communicating air tubes, one for connection to an air pressure source, the other for connection to a tire, each of said tubes having a port; an elastic sleeve encompassing both of said ports and adapted to open above a certain pressure to permit air to flow between the ports beneath the membrane; a pressure casing around said sleeve; and means operative when the pressure in the tube connected to a tire exceeds by a given amount the said certain pressure required to open said sleeve to cause air from the air pressure source to be transmitted to said casing for application to said sleeve in a manner to augment its elastic force to effect its closing.

PIERRE MARCEL BOURDON.